(12) United States Patent
Matsumura et al.

(10) Patent No.: US 7,675,540 B2
(45) Date of Patent: Mar. 9, 2010

(54) CONCEALED REGIONS COMPLEMENTING SYSTEM OF FREE VIEWPOINT VIDEO IMAGES

(75) Inventors: Atsushi Matsumura, Saitama (JP); Sei Naito, Saitama (JP); Ryoichi Kawada, Saitama (JP); Atsushi Koike, Saitama (JP); Shuichi Matsumoto, Saitama (JP)

(73) Assignee: KDDI Corporation, Tokyo (JP)

( * ) Notice: Subject to any disclaimer, the term of this patent is extended or adjusted under 35 U.S.C. 154(b) by 1576 days.

(21) Appl. No.: 10/898,166

(22) Filed: Jul. 26, 2004

(65) Prior Publication Data

US 2005/0041737 A1 Feb. 24, 2005

(30) Foreign Application Priority Data

Aug. 19, 2003 (JP) ............................. 2003-295190
Jan. 28, 2004 (JP) ............................. 2004-019718

(51) Int. Cl.
*H04N 13/04* (2006.01)
*G06T 15/40* (2006.01)
*G09G 5/00* (2006.01)

(52) U.S. Cl. ..................... 348/51; 345/421; 345/640
(58) Field of Classification Search ................. 348/51; 345/419, 421, 422, 488, 623, 640; 375/240
See application file for complete search history.

(56) References Cited

U.S. PATENT DOCUMENTS

| | | | | |
|---|---|---|---|---|
| 6,005,967 A * | 12/1999 | Nakagawa et al. | ........... | 382/154 |
| 6,016,150 A * | 1/2000 | Lengyel et al. | ............ | 345/426 |
| 6,104,438 A * | 8/2000 | Saito | .......................... | 348/587 |
| 6,361,171 B1 * | 3/2002 | Ejiri et al. | ..................... | 353/69 |
| 6,733,138 B2 * | 5/2004 | Raskar | .......................... | 353/94 |
| 6,928,113 B1 * | 8/2005 | Mihara | ................. | 375/240.05 |
| 6,975,756 B1 * | 12/2005 | Slabaugh et al. | ............ | 382/154 |
| 7,230,653 B1 * | 6/2007 | Overton et al. | .............. | 348/584 |

(Continued)

FOREIGN PATENT DOCUMENTS

JP 2000-057350 A 2/2000

(Continued)

OTHER PUBLICATIONS

Yaguchi, Satoshi et al.; "Arbitrary View Generation from Uncalibrated Multiple View Camera System"; IPSJ Journal, vol. 42, No. SIG06, pp. 9-21, Jun. 2001 with an English Abstract.

(Continued)

*Primary Examiner*—Tung Vo
*Assistant Examiner*—Anner Holder
(74) *Attorney, Agent, or Firm*—Westerman, Hattori, Daniels & Adrian, LLP

(57) ABSTRACT

A sender produces a background video image 4 from a reference video image 1 and a depth map 3 and synthesizes the background video image 4 in a background buffer 5. A projection converting matrix 6 for synthesizing is calculated. A receiver receives the reference video image 1, the depth map 3 and the projection converting matrix 6. The receiver produces a free viewpoint video image 11 and a background video image 12. The background buffer 13 is dynamically renewed. The free viewpoint video image 11 and the image in the background buffer 13 are synthesized with each other, and the background video image in the concealed regions in the free viewpoint video image are complemented to obtain the complemented image 14.

2 Claims, 7 Drawing Sheets

U.S. PATENT DOCUMENTS 7,447,380 B2 * 11/2008 Williams et al. ............ 382/284
2003/0146922 A1 * 8/2003 Navab et al. ................ 345/633

OTHER PUBLICATIONS

Park, Jong-Il et al.; "Efficient Arbitrary View Generation Using Multiple Cameras"; IEICE Technical Report, vol. 98, No. 576, pp. 7-12, Feb. 1999 with an English Abstract.

Moezzi, S. et al. "*Virtual View Generation for 3D Digital Video*", IEEE Multimedia, Jan.-Mar. 1997, vol. 4, No. 1, pp. 18-26.

Inamoto, N. et al. "*Intermediate View Generation of Soccer Scene from Multiple Videos*", Technical Report of IEICE, vol. 101, No. 422, PRMU 2001-151 (The Institute of Electronics, Information and Communication Engineers), Nov. 2001, pp. 87-94.

Kawada, R. et al., "*Realtime Stereo Matching Scheme Based on High-precision Iterative Gradient Method for Multiview Video Transmission*", Proceeding of The 2002 ITE Winter Annual Convention, No. 7-5 (The Institute of Image Information and Television Engineers), Nov. 2002.

Katayama, A. et al., "*A Viewpoint Dependent Stereoscopic Display Method with Interpolation and Reconstruction of Multi-Viewpoint Images*", The Transactions of the Institute of Electronics, Information and Communication Engineers D-II, May 1996, vol. J79-D-II, No. 5, pp. 803-811.

Hiruma, K. et al., "*View Generation for a Virtual Camera Using the Multiple Depth Maps*", The Transactions of the Institute of Electronics, Information and Communication Engineers D-II, May 2001, vol. J84-D-II, No. 5, pp. 805-811.

Jinzenji, K. et al., "*Global Motion Estimation for Sprite Production and Application to Video Coding*", The Transactions of the Institute of Electronics, Information and Communication Engineers D-II, Feb. 2000, vol. J83-D-II, No. 2, pp. 535-544.

Matsumura, A. et al. "*Adaptive Processes of Dynamic Background Buffers for Free View-point Video Images*", Technical Report of IEICE, vol. 103, No. 641, ITS 2003-107 (The Institute of Electronics, Information and Communication Engineers), Feb. 2004, pp. 107-109.

Matsumura A. et al., "*Effective Pixel Interpolation of Occluded Regions Designed for Low Bit-rate Free Viewpoint Video Encoding*", Technical Report of IEICE, vol. 103, No. 323, OIS 2003-41 (The Institute of Electronics, Information and Communication Engineers), Sep. 2003, pp. 63-68.

* cited by examiner (Red Leaves)

(Tulip Garden)

CONCEALED REGIONS COMPLEMENTING SYSTEM OF FREE VIEWPOINT VIDEO IMAGES

BACKGROUND OF THE INVENTION

1. Field of the Invention

The present invention relates to concealed regions complementing system of free viewpoint video images, and more particularly, to concealed regions complementing system of free viewpoint video images in which when the video images from free viewpoints are generated, they are complemented using a background buffer with respect to the regions where corresponding pixels can not be obtained due to concealment.

2. Description of the Related Art

Free viewpoint video images gain the spotlight as one of materials of next-generation interactive video image applications. The free viewpoint video images are images which are obtained if a user freely selects viewpoints with respect to a subject. Since there exist infinite viewpoints to be selected by the user, it is impractical to prepare all video images corresponding to the viewpoints.

Thereupon, it is conventionally used a technique to render images at the free viewpoints using a material of a subject described by 3-D information. For example, the following non-patent document 1 proposes a technique which uses 3-D position information as a material, and the following non-patent document 2 proposes a technique which uses the video images of a subject shoot from many directions as materials.

However, these techniques have a problem that a special apparatus is required for obtaining precise 3-D information, and since it is necessary to fix a large number of cameras for shooting a subject from various directions, shooting environment is limited.

The development of transfer of additional information together with video images has been pursued for the sake of providing interactive video image application between itself and a user. For example, if depth information or parallax information is transferred as the additional information, it becomes possible to generate video images from free viewpoints (free viewpoint video images, hereinafter).

With this tendency, various proposals for generating the free viewpoint video images using the depth information or the parallax information have been made. For example, the following non-patent document 3 proposes a corresponding technique for precisely generating the depth information, and this makes it possible to precisely calculate the depth information. The following non-patent document 4 proposes a technique for rendering each object precisely from another viewpoint.

When the free viewpoint video images are produced using these techniques, since the background regions are not taken into account, there is a problem that concealed regions are not sufficiently rendered.

There is a technique for estimating 3-D information based on a reference video image and the depth information (depth map) of each pixel of the reference video image.

In the case of the technique for estimating the 3-D information based on the reference video image and the depth map of each pixel of the reference video image, a range of viewpoints which can be selected is limited, but since the depth map can be handled as the associated information of the reference video image, this technique has excellent consistency with respect to encoded format which corresponds to transfer of the associated information such as MPEG-4, this technique can be used also in an environment such as outdoor where a large number of cameras can not be fixed, and this technique has a merit that versatility is high. However, in this technique, since pixel information of the background regions which are concealed by the foreground regions are missing, there is a problem that pixels which can not be rendered are generated in the free viewpoint video images.

The following non-patent document 5 proposes a generating method of free viewpoint video images in which a depth map of each video image is produced based on a plurality of video images. According to this method, since a plurality of video images and the depth maps corresponding to the video images are required, there is a problem that the amount of information to be transferred is increased.

The following non-patent document 6 proposes a method in which a foreground video image and a background video image are separated from each other, and the background video image is complemented using a sprite. According to this method, however, since it is absolutely necessary that the background video image is known, there is a problem that if the background video image can not be obtained previously, it is difficult to complement.

[Non-patent document 1] Saied Moezzi, Li-Cheng Tai, and Philippe Gerard "Vertual View Generation for 3-D Digital Video", IEEE Multimedia, Vol. 4, No. 1, pp 18 to 26, 1997

[Non-patent document 2] Naho Hashimoto, Hideo Saito, intermediate picture generation from multi-viewpoint picture in soccer scene, Denshi Jouhou Tsushin Gakkai Gijyutu Houkoku, PRMU2001-151, November 2001, pp. 87 to 94

[Non-patent document 3] "Actual time stereo matching system using high precision repeating gradient for multi-viewpoint transfer" of Kawada et al, 2002, picture media gakkai Touki Taikai, No. 7 to 5, November 2002

[Non-patent document 4] "Viewpoint following type stereo picture rendering method by complement and re-construction of multi-viewpoint video image", &J79-D-II, No. 5, pp 803 to 811, May 1996

[Non-patent document 5] "Virtual viewpoint video image production using a plurality of depth maps" by Hiruma et al, Denshi Jouhou Tuushin Gakkai Ronnbun, Vol. J84-D-II, No. 5, pp. 805 to 811, May 2001

[Non-patent document 6] "Global motion calculating method and application of encoding for producing sprite", Denshi Jouhou Tuushin Gakkai Ronnbun, Vol. J84-D-II, No 2, pp. 535-544, February 2002

SUMMARY OF THE INVENTION

It is an object of the present invention to provide concealed regions complementing system of free viewpoint video images in which the above-described conventional problems are solved, and concealed regions can be rendered without increasing the amount of data.

It is another object of the invention to provide concealed regions complementing system of free viewpoint video images in which pixels can widely and precisely be complemented in background regions which are concealed by foreground regions in a reference video image.

In order to accomplish the object, a first feature of the present invention is that a concealed regions complementing system of free viewpoint video images having a sender-side apparatus, said sender-side apparatus comprising a reference video image obtained by shooting from one viewpoint, a depth map in which depths of the pixels in the reference video image are described, a background video image produced by the reference video image and the depth map, a background buffer for storing the background video image, and means which obtains a projection converting equation for describing the background video image in the background buffer.

Also, a second feature of the present invention is that a concealed regions complementing system of free viewpoint video images having a receiver-side apparatus, said receiver-side apparatus comprising means for receiving the reference video image, the depth map and a projection converting matrix in the projection converting equation from the sender-side apparatus described in claim 1, means for producing the free viewpoint video images and the background video image from the reference video image and the depth map, a background buffer for storing the background video image, and means for dynamically renewing the background buffer for each frame using three elements, i.e., the background video image, the video image in the background buffer, and the projection converting matrix.

Also, a third feature of the present invention is that the concealed regions complementing system of the free viewpoint video images, further comprising means for calculating corresponding points between the video image in the background buffer and the free viewpoint video images using the projection converting matrix and the depth map, and for calculating a projection converting equation using the corresponding points, and means for complementing the background video image in the concealed regions in the free viewpoint video images using the projection converting equation.

Also, a fourth feature of the present invention is that a concealed regions complementing system of free viewpoint video images in which when the free viewpoint video images are output, the pixels in background regions concealed by foreground regions in a reference video image are complemented, said system comprising background regions extracting means for extracting, from an input video image, the background regions as a single-layered background video image and multi-layered background video images divided in accordance with depth, a single-layered background buffer for storing the single-layered background video image, and multi-layered background buffers for storing the multi-layered background video images, wherein when the free viewpoint video images are output, the pixels in the background regions concealed by foreground regions in a reference video image are complemented using the pixels of the multi-layered background video images stored in the multi-layered background buffers, and the pixels which are not complemented by this operation are complemented using the pixels of the single-layered background video image stored in the single-layered background buffer.

According to the present invention, processing for obtaining a projection converting equation which requires great calculation load and which describes the background video image in a background buffer can be carried out by a sender.

With the invention, a background buffer can be renewed dynamically for each frame with a small calculation load, and precise free viewpoint video images in which concealed video images are complemented can be produced without increasing the transfer amount.

According to the invention, concealed regions of free viewpoint video images can be complemented without increasing the information amount to be transferred from a sender to a receiver and without applying a large processing load to the receiver. Further, the receiver can produce precise free viewpoint video images in which concealed regions are complemented.

Further, with the invention, it is possible to widely and precisely complement while taking advantages of a complement technique using multi-layered background buffers and a complement technique using a single-layered background buffer.

DETAILED DESCRIPTION OF THE PREFERRED EMBODIMENT

Figure 1:
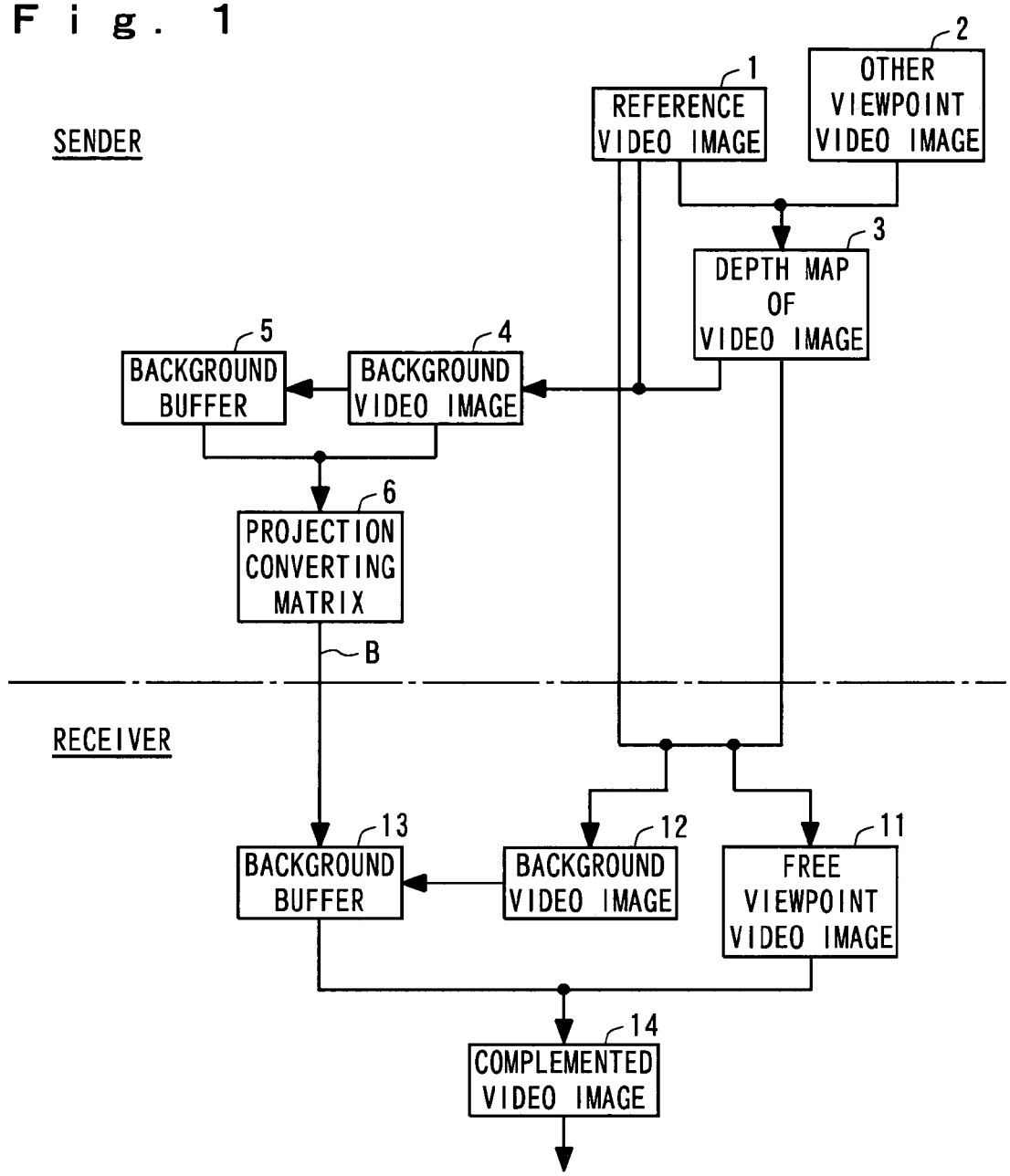
FIG. 1 is a block diagram showing function of a first embodiment of the present invention.

The present invention will be explained in detail with reference to the drawings. FIG. 1 is a diagram for explaining the processing of a first embodiment of the invention.

A sender, e.g., a broadcast station produces a depth map 3 of a video image (or pixels) from the video image (reference video image, hereinafter) obtained by shooting an object from a certain viewpoint and a video image 2 obtained by shooting the object from other viewpoint. Since the producing method of the depth map 3 of the video image is known, explanation thereof will be omitted. Next, the background video image 4 of the reference video image 1 is extracted from the reference video image 1 and the depth map 3 of the video image. A background buffer 5 is produced, the background video image 4 is synthesized with the background buffer 5, i.e., overwritten on the background buffer 5. At that time, a projection converting equation (projection converting matrix, hereinafter) 6 for carrying out the synthesis is calculated. Although a receiver can also calculate the projection converting matrix 6, since the load of the calculation amount required for the calculation is high, the sender calculates the projection converting matrix 6 and the calculated matrix is sent to the receiver.

This operation will be explained in more detail. In the extraction of the background video image 4, the reference video image 1 and the depth map 3 of the video image are used, if a value of the depth is equal to or higher than a threshold value Th, the region is judged as being the background video image, and if the depth value is smaller than the threshold value Th, the region is judged as being the foreground video image. Next, in a first frame where a video image does not exist in the background buffer 5, the separated background video image is written in the background buffer 5. In frames after a second frame, a background video image of each frame is synthesized with data stored in the background buffer 5. At that time, a projection converting matrix 6 (B) between the current buffer and the video image extracted as the background is calculated. This projection converting matrix B is defined by the following equation (1):

$$(u, v, 1)^T \times B(u', v', 1)^T = 0 \quad (1)$$

Here, (u, v, 1) is a position of a pixel of a background video image stored in the current buffer, and (u', v', 1) is a position of a pixel corresponding to the (u, v, 1) of the background video image to be synthesized.

The projection converting matrix B is a 3×3 matrix, but since the scale can arbitrarily be determined, a free degree is 8. That is, if at least 8 points of correspondence of the (u, v, 1) and (u', v', 1)' are obtained, the projection converting matrix B can be calculated. Since the calculation amount for finding the corresponding point S becomes large, it is preferable that a sender such as a broadcast station capable of preparing a calculating apparatus having large processing ability calculates the projection converting matrix 6 as described above.

Next, a receiver produces the free viewpoint video image 11 using the reference video image 1 which was sent from the sender and which was shot from a certain viewpoint and the depth map 3 of the video image. Since this processing is known, the processing will be explained briefly.

In the depth map 3 of the video image, since depth $Z_{uv}$ in each pixel of the reference video image 1 is described, a position on 3-D of each pixel can be obtained by coordinates of each pixel of the subject video image and depth. Using this, a video image from a free viewpoint is produced. Rotation of a camera is defined as matrix R', and parallel movement of the camera is defined as 1×3 vector t'. If a position of a pixel in the reference video image is expressed as (u, v), a relation between the corresponding point (u", v") in a free viewpoint and (u, v) is expressed by the following equation (2):

$$(u'', v'', 1)^T \times (Z_{uv} R'(u, v, 1)^T + t') = 0 \quad (2)$$

If the equation (2) is solved for $(u'', v'', 1)^T$, coordinates of each point in the free viewpoint can be obtained. By giving brightness of (u, v) in the reference video image to the obtained (u", v"), the free viewpoint video image is produced.

Figure 2:
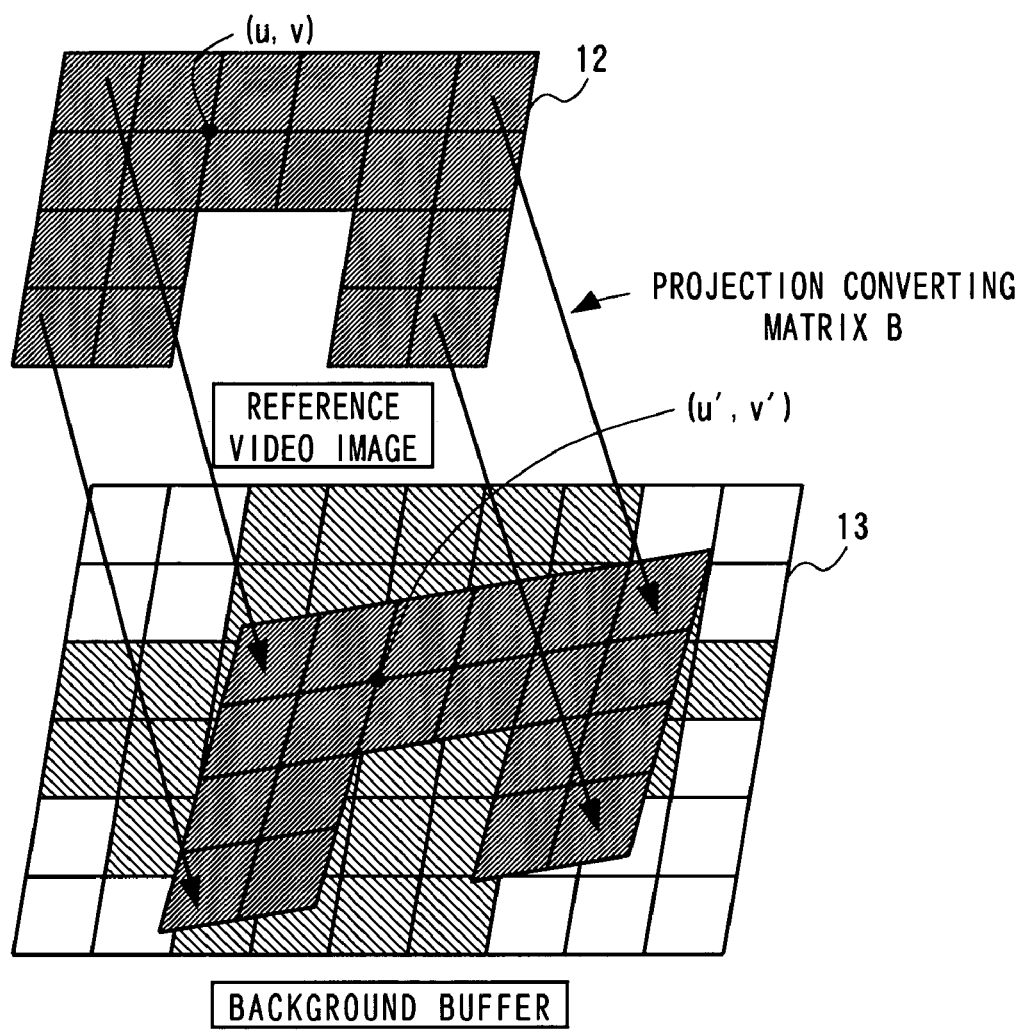
FIG. 2 is a conception diagram of processing for synthesizing a background video image of a reference video image with a background buffer.

A background video image 12 of the reference video image 1 is extracted from the reference video image 1 and the depth map 3 of the video image. Then, the background video image 12 is synthesized with a background buffer 13 using the projection converting matrix B sent from the sender. FIG. 2 is a conception diagram of the synthesis, and the background video image 12 is synthesized with the background buffer 13 by projection conversion using the projection converting matrix B. At that time, if it is judged that both the reference video image and the background buffer at the same point are background video images, a higher priority is given to a pixel of the reference video image. With this, it becomes possible to synthesize while giving a higher priority to a newer information, and it is possible to allow the information to correspond to motion of the background regions in each frame. As the number of frames of video images is increased, data amount of the background video image of the video image accumulated in the background buffer 13 is increased, and the concealed regions of the video image become smaller. It is apparent that data amount of projection converting matrix B sent from the sender to the receiver is small.

Next, if the free viewpoint video image 11 and the background video image accumulated in the background buffer 13 are synthesized with each other, a video image 14 whose concealed regions are complemented can be obtained. The complement method will be explained below.

First, a projection converting matrix B' between the free viewpoint video image and the background buffer video image is calculated. Here, corresponding points between the video images are required, but if the relation of the corresponding points obtained from the sent depth and the projection converting matrix B calculated using the equation (1) is used, the corresponding points can be calculated without using the matching. Since this calculation can be carried out with small processing amount, a load of the calculation amount of the receiver, e.g., a cellular phone is reduced.

Then, using the calculated projection converting matrix B', the part which is judged as having no corresponding point is complemented. When a point (u", v") is complemented, a point (u', v', 1) which satisfied the following equation (3) is calculated, and the brightness in the pixel (u', v') of the video reference video image is defined as brightness of (u", v")

$$(u', v', 1)^T \times B(u'', v'', 1)^T = 0 \quad (3)$$

Figure 3:
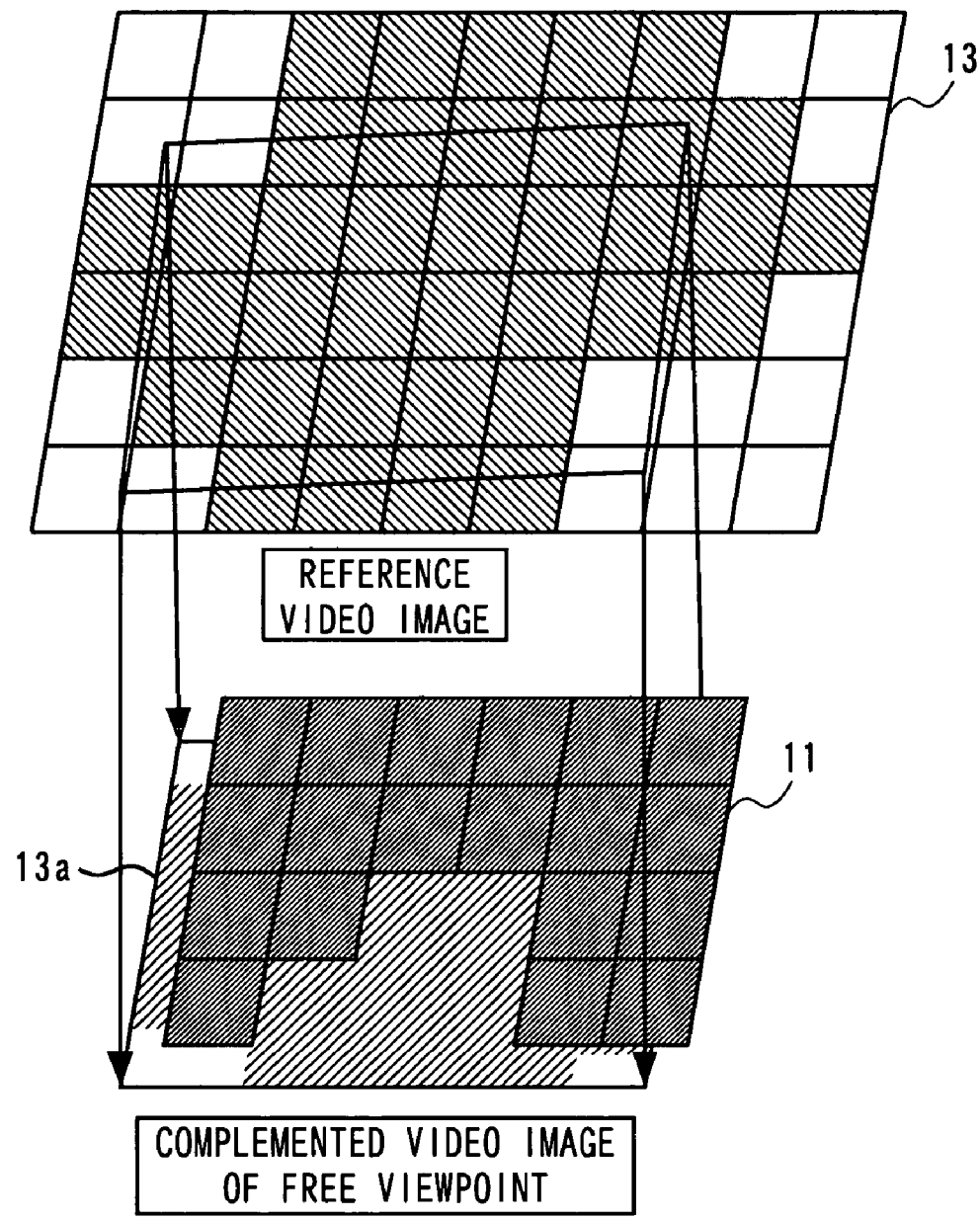
FIG. 3 is a conception diagram of synthesizing processing of a video image in the background buffer and a free viewpoint video image.

FIG. 3 shows a background location 13a in which the background buffer 13 and the free viewpoint video image 11 correspond to each other. If the free viewpoint video image 11 and the background regions 13a which correspond to each other are synthesized with each other, the complement can be carried out. If u' and v' are not integers, the brightness value is corrected by linear complement.

With the above processing, the concealed regions and the regions which is judged as having no corresponding point due to erroneous correspondence can precisely be complemented.

The present inventor conducted the following experiment to check or confirm the effectiveness of the concealed regions complement method of the free viewpoint video images.

That is, 8 level gray scale video image with only brightness value in Red which is a standard video image by Video Information Media Institute is used. In the experiment, depths are calculated by a right eye image using a left eye image as a reference video image. The receiver assumed that the reference video image and the depth with respect of each pixel were received and based on this, the video image which was defined as the right eye image was reproduced.

Figure 4A:
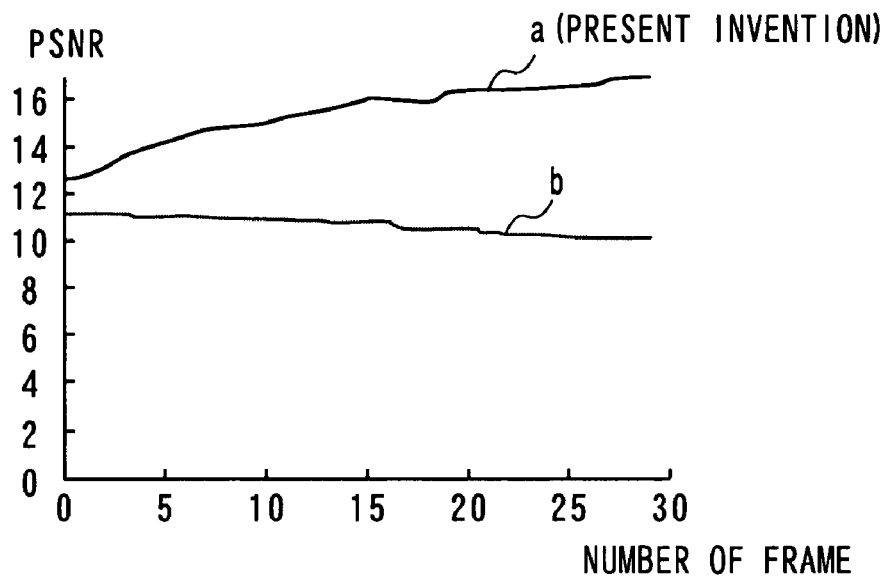
FIGS. 4A and 4B are graphs showing PSNR of a free viewpoint video image and a ratio of pixels which were not rendered in an experiment example in which concealed regions of the free viewpoint video image are complemented according to the first embodiment of the invention.
Figure 4B:
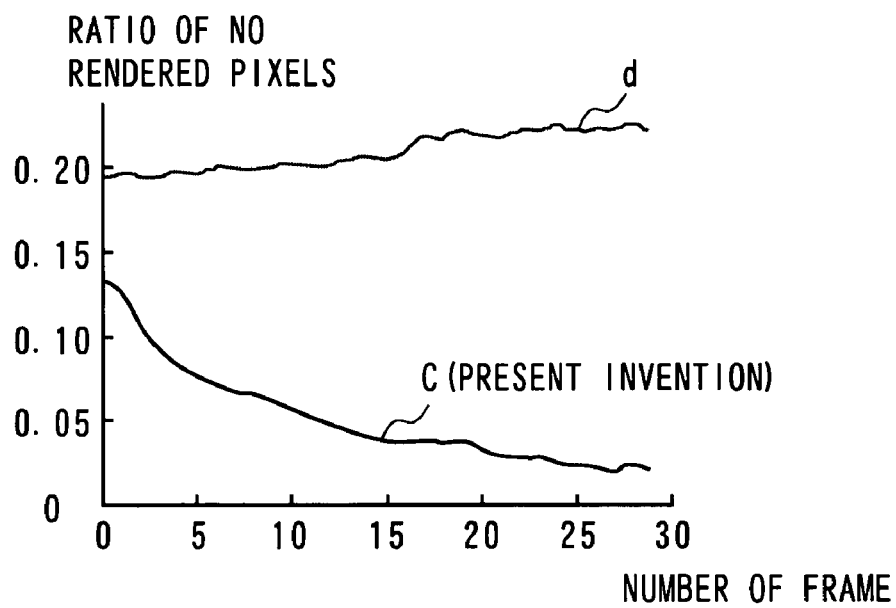

FIGS. 4A and 4B show the results of the experiment. Lateral axes in FIGS. 4A and 4B show the number of frames, and vertical axes show PSNR and the ratio of pixels which were judged as having no corresponding point and which were not rendered. It can be found from FIG. 4A that PSNR of the complemented video image (curve a) was enhanced as the number of frames was increased as compared with the video image (curve b) which was not complemented, and the precise video image could be obtained.

It can be found from FIG. 4B that in the case of the complemented video image (curve c), the ratio of pixels which are not rendered is largely reduced as the number of frames is increased, but the ratio of pixels of the non-complemented video image (curve d) is gradually increased.

Therefore, according to the first embodiment of the present invention, it was confirmed that the concealed regions of the free viewpoint video image are precisely complemented.

Next, a second embodiment of the invention will be explained. In the second embodiment, the concealed regions of free viewpoint images are complemented using both a single-layered background buffer and multi-layered background buffers.

Figure 6:
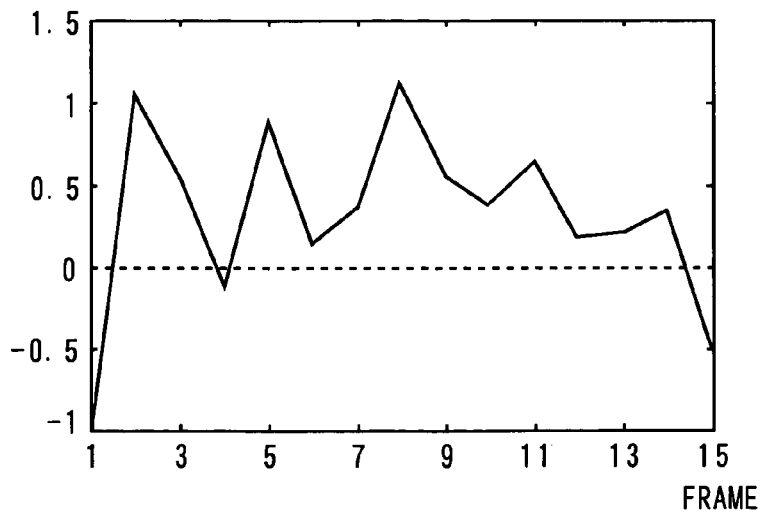
FIG. 6 is a diagram showing a difference of PSNR only of pixels in which complement was carried out commonly by a complement technique using a single-layered background buffer and a complement technique using multi-layered background buffers.
Figure 7:
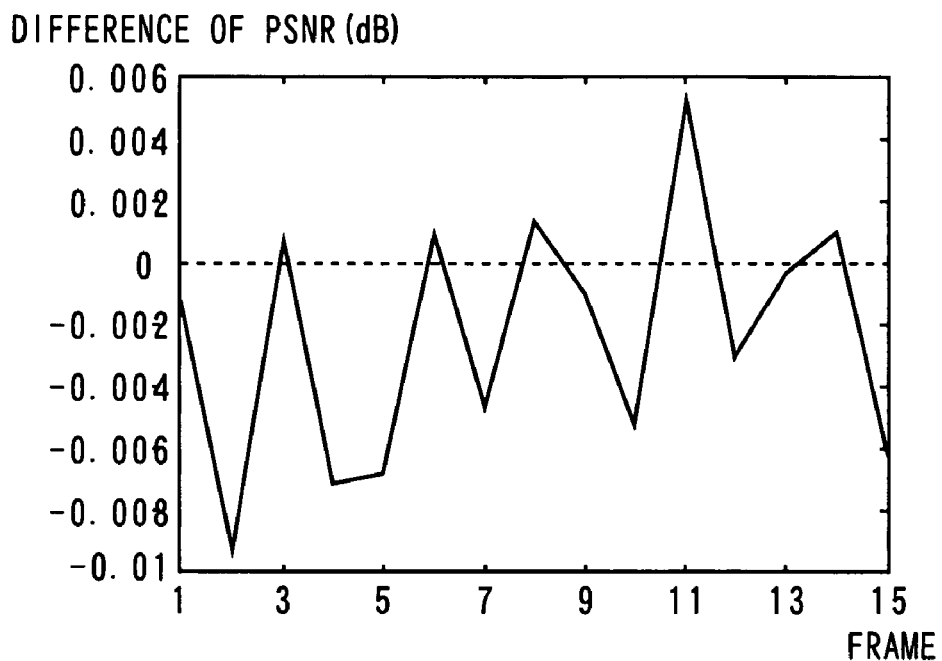
FIG. 7 is a diagram showing a difference of PSNR of the entire video image by each of the techniques.
Figure 8:
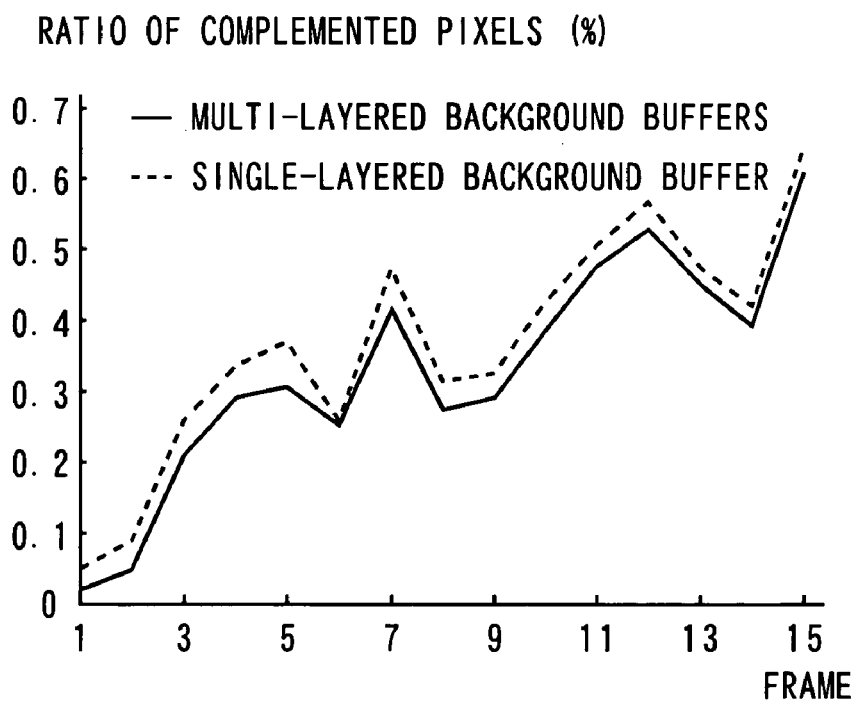
FIG. 8 is a diagram showing a ratio of complemented pixels by each of the techniques.

First, complement precision of the complement method using the single-layered background buffer and the complement method using the multi-layered background buffers will be explained. FIGS. 6 to 8 show the result of verification experiment of complement precision of each method.

In the experiment, a region of 960×480 pixels was cut out from a Y signal of Tulip Garden which was an HDTV stereo standard video image by Video Information Media Institute, a left eye image was used as a reference video image, a horizontal component of a parallax vector in the left eye image estimated using a right eye image was used as a depth map. A right eye image was produced from the reference video image and the depth map, and the produced video image qualities were compared with each other.

FIG. 6 shows the difference of PSNR (peak signal noise ratio) of only pixels which are complemented commonly by a complement method using the single-layered background buffer and the complement method using the multi-layered background buffers. FIG. 7 shows the difference of PSNR of the entire video image by each method.

In FIGS. 6 and 7, the positive value shows that the PSNR of the complement method using the multi-layered background buffers is higher than PSNR of the complement method using the single-layered background buffer, and the negative value shows that the PSNR of the complement method using the single-layered background buffer is higher than that of the PSNR of the complement method using the multi-layered background buffers.

It can be found from FIGS. 6 and 7 that in the pixels which are complemented commonly by the both methods, the complement method using the multi-layered background buffers shows more excellent result than the complement method using the single-layered background buffer, and in the entire video image, the complement method using the single-layered background buffer shows more excellent result than the complement method using the multi-layered background buffers.

FIG. 8 shows the ratio of the pixels complemented by each method. FIG. 8 shows that the ratio of the pixels which are complemented by the complement method using the single-layered background buffer is greater than that by the complement method using the multi-layered background buffers. It is estimated that in the result shown in FIGS. 6 and 7, there exists the pixels which can not be complemented by the complement method using the multi-layered background buffers and which are complemented only by the complement method using the single-layered background buffer.

The following properties are estimated from the above results of the experiment:

(1) The complement method using the single-layered background buffer complements the pixels in a wider region as compared with the complement method using the multi-layered background buffers. This is because that in the complement method using the multi-layered background buffers, the regions to be complemented are superposed, and gaps are generated at boundaries between the regions to be complemented.

(2) The complement method using the multi-layered background buffers complements the pixels more precisely in each pixel.

In the second embodiment of the present invention, the above properties are utilized, the pixels are precisely complemented by the complement method using the multi-layered background buffers, and the pixels which could not be complemented by this method are complemented by the complement method using the single-layered background buffer so that the pixels in a wider range can be complemented precisely. The second embodiment of the invention will be explained with reference to the drawings.

Figure 5:
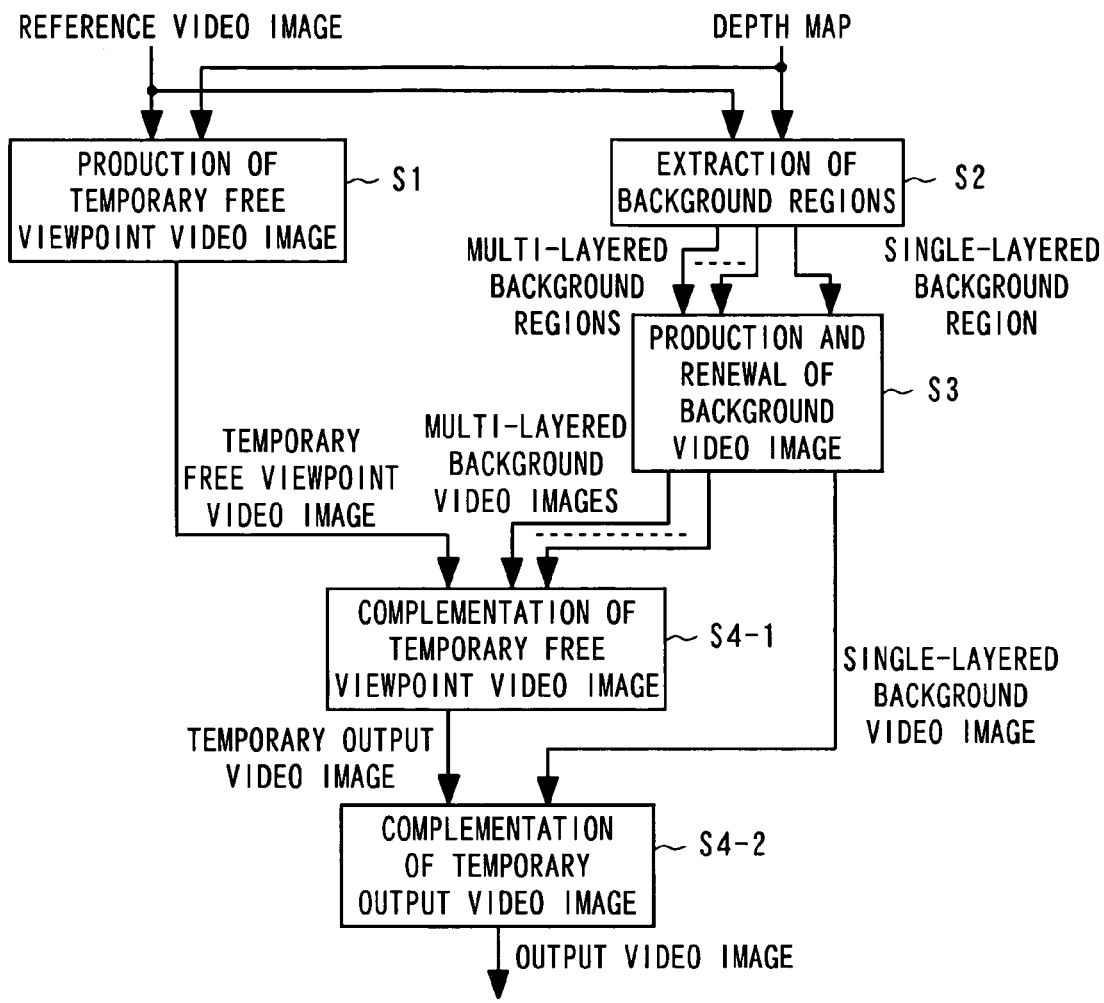
FIG. 5 is a flowchart showing processing procedure in concealed regions complementing system of free viewpoint video images according to a second embodiment of the invention.

FIG. 5 is a flowchart showing the processing procedure in the concealed regions complementing system of free viewpoint video images according to the second embodiment of the invention. Each step of this processing procedure can be realized by hardware or software.

As shown in FIG. 5, in the second embodiment of the invention, a temporary free viewpoint video image of each frame is produced from the reference video image and the depth map (S1). At the same time, the background regions is extracted from the reference video image and the depth map (S2). In the extraction of the background regions, the background video images which are to be stored in both the single-layered background buffer and the multi-layered background buffers are extracted as the background regions. Next, the extracted background video images are stored in the single-layered background buffer and the multi-layered background buffers. The background video images stored here are renewed by the subsequent and latest background video images which are extracted for each frame. That is, the background video images are dynamically produced and renewed in the single-layered background buffer and the multi-layered background buffers (S3). By using the background video images which were dynamically produced and renewed, the pixels in the background regions which are concealed by the foreground regions in the reference video image can be complemented more completely. Even if the background video images which are produced and renewed by the background video images extracted from an image before one frame or from an image before several frames, the pixels can be complemented to some degrees.

Next, the temporary free viewpoint video image produced in S1 is complemented by the background video images stored in the multi-layered background buffers (S4-1) and then, the pixels which could not be complemented by this are complemented by the background video image stored in the single-layered background buffer (S4-2). With the above procedure, it is possible to carry out wider and precise complement while taking the advantages of the complement method using the multi-layered background buffers and the complement method using the single-layered background buffer.

The steps of the processing procedure will be explained in detail.

1. Production of Temporary Tree Viewpoint Video Image (S1)

First, if the rotation and parallel movement from a viewpoint from which a reference video image I is shot to a free viewpoint are defined as 3×3 matrix R' and 1×3 vector t', a relation between a position (u, v, 1) in the reference video image I and a position (u", v", 1) of a pixel (corresponding point, hereinafter) corresponding to the former pixel in a free viewpoint video image A is expressed by the following equation (4). Here, $D_{1(v, u)}$ represents a depth of the position of (u, v) of the pixel in the reference video image I, and (u, v, 1) and (u", v", 1) represents 3-D positions of the pixels. The unit of the depth follows the definition of the depth map.

$$(D_{1(u, v)}(u, v, 1)^T - t') \times R'(u", v", 1)^T = 0 \qquad (4)$$

By solving the equation (4) based on $(u", v", 1)^T$, the corresponding point between the reference video image I and the free viewpoint video image A can be obtained. Rendering is carried out by the following equation (5) using this correspondence relation, a temporary free viewpoint video image A is produced. In the equation (5), A(u", v") represents a pixel value of the position (u", v") of the free viewpoint video image A, and I(u, v) represents a pixel value of the position (u, v) of the reference video image I.

$$A(u", v") = I(u, v) \qquad (5)$$

2. Extraction of Background Regions (S2)

The extraction of the background regions is a processing for extracting the background video images which are to be stored in the multi-layered background buffers and the single-layered background buffer. The extraction of the background regions is carried out as a pre-processing of the production and renewal of the background video images. Here, using the following equation (6), a statistic of the depth distribution of the reference video image I is obtained. A right side of the equation (6) means the number of the pixels in which the depth in the reference video image I is equal to or greater than nS and less than (n+1)S, and S means the step width when the statistic is obtained. Further, n is an integer.

$$V(n) = v(I)_{(n+1)S}^{nS} \tag{6}$$

Next, the V(n) obtained by the equation (6) is smoothened by a Gaussian filter, and V'(n) is calculated. Here, the depths when the V'(n) are extremely small values are defined as division indices (values of integer times of S), and the division indices $\min_1, \min_2, \ldots, \min_M$ are produced in the increasing order of values. Finally, the reference video image I is divided into a plurality of video images $I_m$(m=0.1, ..., M) in accordance with the following equation (7). In the equation (7), null means that no pixel exists. Further, $\min_0 = -\infty$, $\min_{M+1} = \infty$. The plurality of video images $I_m$(m=1, ..., M) are used for producing and renewing the background video images in the multi-layered buffers.

$$I_m(u, v) = \begin{cases} I(u, v) & \text{if } \min_m \leq D_{I(u,v)} < \min_{m+1} \\ \text{null} & \text{otherwise} \end{cases} \tag{7}$$

Further, a video image $I_{all}$ produced by the following equation (8) is defined. The video image $I_{all}$ is used for producing and renewing the background video image in the single-layered background buffer.

$$I_{all}(u, v) = \begin{cases} I(u, v) & \text{if } D_{I(u,v)} < \min_M \\ \text{null} & \text{otherwise} \end{cases} \tag{8}$$

3. Production and Renewal of Background Video Images (S3)

The video images $I_m$(m=1, ..., M, all) extracted by the extraction (S2) of the background regions are stored in the background buffer (multi-layered background buffers and the single-layered background buffer), and they are renewed for respective frames. Since the video image $I_o$ is a foreground video image, a background buffer $U_o$ corresponding thereto does not exist.

In the top frame, the video images $I_m$ are stored in the background buffers $U_m$ as they are. For subsequent other frames, the video images $I_m$ and images stored in the background buffers $U_m$ are synthesized with each other in accordance with the following procedure.

First, eight or more corresponding points are searched from the video images $I_m$ and the background video images stored in background buffers $U_m$, and using these corresponding points, projection converting matrix $B_m$ which satisfies the following equation (9) is calculated. The coordinates $(U_{Im}, v_{Im})$ in the video images $I_m$, and the coordinates $(U'_{um}, V'_{um})$ in the video images stored in the background buffers $U_m$ are assumed to be corresponding points.

$$(U_{Im}, V_{Im}, 1)^T \times B_m (U'_{um}, V'_{um}, 1)^T = 0 \tag{9}$$

Thereafter, the correspondence between the $(U_{Im}, V_{Im})$ and $(U'_{um}, V'_{um})$ obtained by the equation (6) is substituted into the following equation (10), thereby renewing the background video images stored in the background buffers Um(m=1, ..., M, all). In the equation (7), "←" means that a value in the right side is substituted into the left side.

$$U_m(u'_{Um}, v'_{Um}) \leftarrow \begin{cases} U_m(u'_{Um}, v'_{Um}) & \text{if } I_m(u_{Im}, v_{Im}) = \text{null} \\ I_m(u_{Im}, v_{Im}) & \text{otherwise} \end{cases} \tag{10}$$

4. Production of Output Video Image (S4, S5)

A temporary free viewpoint video image A is complemented by the background video images stored in the background buffers $U_m$(m=1, ..., M all), thereby producing an output video image. The complement is carried out with respect to the pixels in which no corresponding point exists.

First, in order to carry out the complement using the multi-layered background buffers, eight or more corresponding points between the temporary free viewpoint video image A and the background video images stored in the background buffers $U_m$ are obtained on the assumption that m is 1, ..., M, and the projection converting matrix $B'_m$ is calculated by the following equation (11). Here, the coordinates (u", v") in the free viewpoint video image A and the coordinates $(U'_{Um}, V'_{Um})$ of the background video images are corresponding points.

$$(U'_{Um}, V'_{Um}, 1)^T \times B'_m(u'', v'', 1)^T = 0 \tag{11}$$

Next, the correspondence between (U", V") and $(U'_{Um}, V'_{Um})$ obtained by the equation (11) is substituted into the following equation (12), thereby complementing the free viewpoint video image A. In the equation (12), "←" means that a value in the right side is substituted into the left side.

$$A(u'', v'') \leftarrow \begin{cases} U_m(u'_{Um}, v'_{Um}) & \text{if } A(u'', v'') = \text{null} \\ A(u'', v'') & \text{otherwise} \end{cases} \tag{12}$$

In order to carry out the complement using the single-layered background buffer, the projection converting matrix is calculated on the assumption that m is all in the above-described manner, and the free viewpoint video image A is complemented using this projection converting matrix. The complement using the single-layered background buffer is carried out for the pixels of A(u", v")=null, i.e., the pixels which is not complemented by the complement using the multi-layered background buffers. The video image obtained by the above operation is output as the output video image.

Figure 9A:
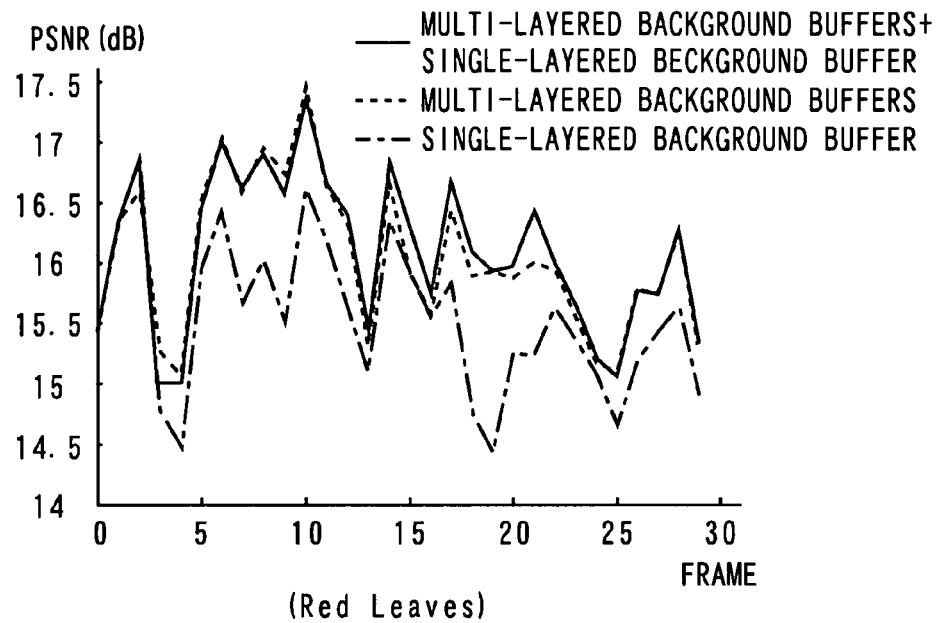
FIGS. 9A and 9B are diagrams showing comparison of reproduced video image quality by each technique including the second embodiment of the invention.
Figure 9B:
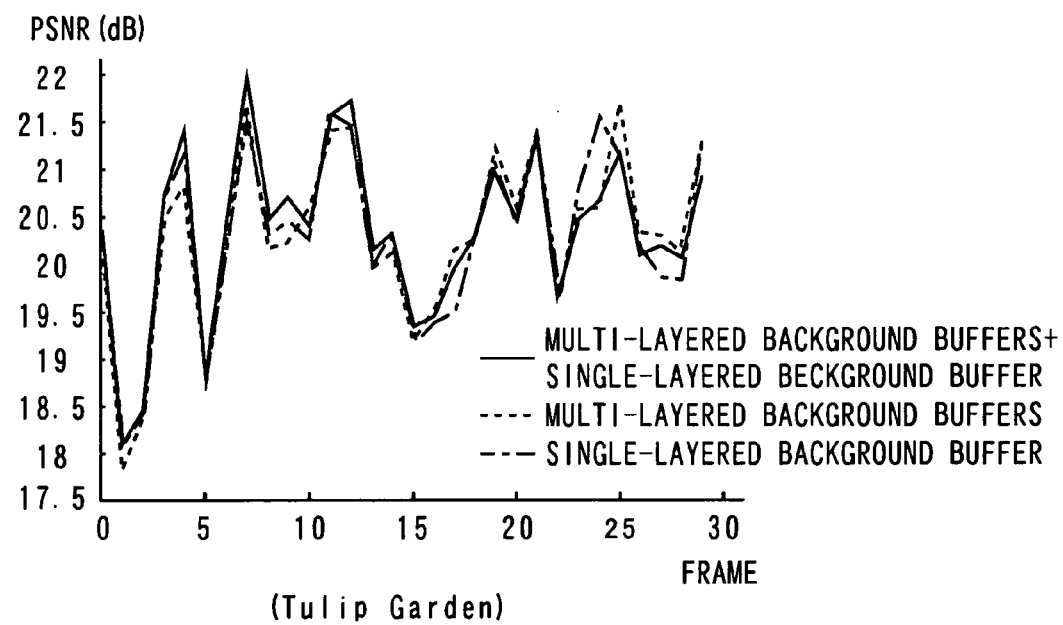

FIGS. 9A and 9B show a comparison of video image qualities reproduced by each method including the second embodiment of the present invention. Those are results obtained by a verification experiment carried out in the following manner. That is, a region of 960×480 pixels was cut out Y signals from Tulip Garden and Red Leaves which were an HDTV stereo standard video image by Video Information Media Institute, the left eye image was used as a reference video image, the horizontal component of the parallax vector in a left eye image estimated using the right eye image was used as the depth map. The right eye image was produced from the reference video image and the depth map, and the reproduced video image qualities were compared with each other.

Here, the reproduced video image quality of the pixels which were not rendered in the temporary free viewpoint video image, i.e., the pixels which was complemented is shown with PSNR, and the adjacent pixel value was substituted in the pixel which was not complemented in the output video image.

It can be found from FIGS. 9A and 9B that in the case of the Red Leaves having various depths, the average PSNRs of 30 frames of the complement method using a single-layered background buffer, of the complement method using multi-layered background buffers and of the present invention are 15.51 dB, 16.03 dB and 16.08 dB, respectively, and an excellent result is obtained by the present invention, and in the Tulip Garden having smooth depth, the average PSNRs of 30 frames of the complement method using a single-layered background buffer, of the complement method using multi-layered background buffers and of the present invention are 20.27 dB, 20.27 dB and 20.33 dB, and an excellent result is obtained by the present invention.

The second embodiment of the present invention can be carried out in various forms. For example, the reference video image and the depth map are sent from a sender, and free viewpoint video images can be produced by a receiver using the sent reference video image and the depth map. The projection converting matrix for obtaining corresponding points can be calculated by the receiver or the sender, and the projection converting matrix can be sent. The present invention can be applied to a broadcasting receiver, and a portable terminal as a picture receiver.

What is claimed is:

1. A concealed regions complementing system of free viewpoint video images having a sender-side apparatus and a receiver-side apparatus, said sender-side apparatus comprising:
    a reference video image obtained by shooting from one viewpoint,
    a depth map in which depths of the pixels in the reference video image are described,
    a background video image produced by the reference video image and the death map,
    a background buffer for storing the background video image,
    means which obtain a projection converting equation for describing the background video image in the background buffer, and
    means for transmitting the reference video image, the depth map and projection converting matrix in the projection converting equation, and
said receiver-side apparatus comprising:
    means for receiving the reference video image, the depth map and a projection converting matrix in the projection converting equation from the sender-side apparatus,
    means for producing the free viewpoint video images and the background video image from the reference video image and the depth map,
    a background buffer for storing the background video image, and
    means for dynamically renewing the background buffer for each frame using the background video image, the video image in the background buffer, and the projection converting matrix.

2. The concealed regions complementing system of the free viewpoint video images according to claim 1, further comprising:
    means for calculating corresponding points between the video image in the background buffer and the free viewpoint video images using the projection converting matrix and the depth map, and for calculating a projection converting equation using the corresponding points, and
    means for complementing the background video image in the concealed regions in the free viewpoint video images using the projection converting equation.

* * * * *